United States Patent
Cesnak

(10) Patent No.: US 9,735,683 B2
(45) Date of Patent: Aug. 15, 2017

(54) DC/DC CONVERTER WHICH ENSURES DAMPING OF VOLTAGE OVERSHOOTS OF A SEMICONDUCTOR SWITCH

(71) Applicant: Siemens Aktiengesellschaft, München (DE)

(72) Inventor: Lorand Cesnak, Weikendorf (AT)

(73) Assignee: SIEMENS AKTIENGESELLSCHAFT, München (DE)

( * ) Notice: Subject to any disclaimer, the term of this patent is extended or adjusted under 35 U.S.C. 154(b) by 117 days.

(21) Appl. No.: 14/386,188

(22) PCT Filed: Jan. 15, 2013

(86) PCT No.: PCT/EP2013/050632
§ 371 (c)(1),
(2) Date: Sep. 18, 2014

(87) PCT Pub. No.: WO2013/139492
PCT Pub. Date: Sep. 26, 2013

(65) Prior Publication Data
US 2015/0028841 A1 Jan. 29, 2015

(30) Foreign Application Priority Data
Mar. 19, 2012 (DE) ................ 10 2012 204 255

(51) Int. Cl.
*H02M 1/34* (2007.01)
*H02M 3/158* (2006.01)

(52) U.S. Cl.
CPC ........... *H02M 3/1582* (2013.01); *H02M 1/34* (2013.01); *H02M 3/158* (2013.01);
(Continued)

(58) Field of Classification Search
CPC ............ H02M 1/34; H02M 2001/342; H02M 2001/344; H02M 2001/0048;
(Continued)

(56) References Cited

U.S. PATENT DOCUMENTS 5,828,559 A * 10/1998 Chen ................ H02M 1/34
                                                363/132
5,946,178 A *  8/1999 Bijlenga ............ H02M 7/538
                                                363/132
(Continued)

FOREIGN PATENT DOCUMENTS

CN 101355295 A 1/2009
CN 101478143 A 7/2009
(Continued)

OTHER PUBLICATIONS

AN2389, Application Note, "AN MCU-based low cost non-inverting buck-boost converter for battery chargers," STMicroelectronics, Aug. 2007.*
(Continued)

*Primary Examiner* — Jue Zhang
*Assistant Examiner* — Jye-June Lee
(74) *Attorney, Agent, or Firm* — Henry M. Feiereisen LLC

(57) ABSTRACT

A DC/DC converter has an active energy store, such as an inductance, which can be periodically charged and discharged by one or more semiconductor switches, such as transistors. To avoid voltage overshoot, an RCD element is provided for at least one semiconductor switch, wherein a capacitor and a diode of the RCD element are connected in series, and a resistor of the RCD element can be connected either in parallel with the diode or disconnected from the
(Continued)

diode by a switch. The diode of the RCD element is arranged so as to be blocking in the conducting direction of the semiconductor switch.

14 Claims, 3 Drawing Sheets

(52) U.S. Cl.
CPC ...... *H02M 2001/342* (2013.01); *H02M 2001/344* (2013.01); *Y02B 70/1491* (2013.01)

(58) Field of Classification Search
CPC .. H02M 2001/0051; H02M 2001/0054; H02M 2001/0058; H02M 3/158; H02M 3/1582; Y02B 70/1491; H02H 9/04; H02H 9/042; H02H 9/045; H02H 9/046; H02H 9/047
USPC ..... 361/91.1, 91.5, 91.7; 323/271, 282, 272, 323/273, 276, 283, 351; 363/50
See application file for complete search history.

(56) References Cited

U.S. PATENT DOCUMENTS

| | | | |
|---|---|---|---|
| 6,051,961 A | | 4/2000 | Jang |
| 8,890,453 B2 * | | 11/2014 | Kure .................. H02M 3/3376 323/311 |
| 2010/0219801 A1 | | 9/2010 | Mishima |
| 2012/0049818 A1 | | 3/2012 | Hester |

FOREIGN PATENT DOCUMENTS

| | | |
|---|---|---|
| CN | 201355775 Y | 12/2009 |
| DE | 2718996 B1 | 7/1978 |
| DE | 2719026 A1 | 11/1978 |
| DE | 36 16 160 A1 | 11/1987 |
| DE | 19841759 A1 | 4/1999 |
| DE | 102007041510 A1 | 3/2009 |
| EP | 1671737 A2 | 6/2006 |

OTHER PUBLICATIONS

SLYT358 ("Efficiency of synchronous versus nonsynchronous buck converters," R. Nowakowski, N. Tang, Texas Instruments Inc., Microelectronics, 4thQ 2009).*

Wu X. et al; "A Novel Fully Soft Switched (Zero Voltage on and Zero Current Off) Boost Converter with Reduced Conduction Loss"; Conference Record of the 2005 IEEE Industry Apllications Conference Fortieth IAS Annual Meeting Oct. 2-6, 2005 Kowloon, Hong Kong; No. 3; pp. 1973-1979; Isbn: 978-0-7803-9208-3; DOI: 10.110911AS.2005.1518718; XP010842666; 2005; CN; Oct. 2, 2005.

Moschopoulos G. et al; "A New Family of Zero-Voltage-Transition PWM Converters with Dual Active Auxiliary Circuits"; Applied Power Electronics Conference and Exposition, APEC 2005, Twentieth Annual IEEE Austin, TX, Mar. 6-10, 2005, Piscataway NJ; No. 2; pp. 1251-1257; ISBN: 978.0-7803-8975-5; DOI: 10.1109/APEC. 2005.1453164; XP010809456; 2005; US; Mar. 6, 2005.

Ogu Ra K. et al; "Boost Chopper-Fed ZVS-PWM DC-DC Converter with Parasitic Oscillation Surge Suppression-Based Auxiliary Edge Resonant Snubber"; !mein 2003, 25th, International Telecommunications Energy Conference, Yokohama, Oct. 19-23, 2003 IEICE/IEEE INTELEC; pp. 20-26; ISBN: 978-4-88552-196-6; XP031895451; 2003; JP; Oct. 23, 2003.

* cited by examiner

DC/DC CONVERTER WHICH ENSURES DAMPING OF VOLTAGE OVERSHOOTS OF A SEMICONDUCTOR SWITCH

CROSS-REFERENCES TO RELATED APPLICATIONS

This application is the U.S. National Stage of International Application No. PCT/EP2013/050632, filed Jan. 15, 2013, which designated the United States and has been published as International Publication No. WO 2013/139492 and which claims the priority of German Patent Application, Serial No. 10 2012 204 255.5, filed Mar. 19, 2012, pursuant to 35 U.S.C. 119(a)-(d).

BACKGROUND OF THE INVENTION

The invention relates to a DC/DC converter, in which an active energy store, such as an inductance, can be periodically charged and discharged by means of one or more semiconductor switches, such as transistors.

A DC/DC converter refers to an electrical circuit which converts a DC voltage (input voltage) fed in at the input into a DC voltage with a higher, lower or inverted voltage level (output voltage). The conversion takes place with the help of a periodically operating electronic switch and one or more energy stores. The inductance (inductive converter) used for the intermediate storage of the energy consists of a coil or a converter transformer. In contrast, converters with capacitive storage (capacitive converters) are designated as charge pumps.

The present invention is preferably used on upward converters and/or downward converters. Both embodiments use an inductance, such as a storage throttle, as an intermediate store for energy. In an upward converter the output voltage is always greater than or equal to the input voltage, in a downward converter the output voltage is always less than or equal to the input voltage.

PRIOR ART

Because the switching speeds of the transistors mostly used as semiconductor switches (e.g. IGBT, FET, SIC-FET) are constantly increasing, the parasitic inductances in the feed lines to the DC/DC converter cause ever greater voltage overshoots at the transistor. To reduce these voltage overshoots it is necessary to alter the circuits and/or incorporate additional circuits.

One possible alteration of the existing circuit is to increase the gate resistance at the transistor. However, this negates the advantage of the fast transistor, and the switching losses increase.

A first additional circuit consists in wiring the transistor with an RC element, in other words a resistor R and a capacitor C. The turn-off losses of the transistor are thereby in part transferred to the RC element, but the turn-on losses and conduction losses increase because the RC element is quickly discharged.

A second additional circuit consists in wiring the transistor with an RCD element, which in addition to the RC element includes a diode D. This diode makes it possible to reduce the losses in the resistance of the RCD element. By increasing the resistance of the RCD element the losses arising in the switch because of the discharge of the capacitor of the RCD element can be reduced.

Thus according to U.S. Pat. No. 5,986,905 A a flyback converter is known which proposes an RCD element to damp the voltage downstream of a switch which is implemented as a MOSFET or bipolar transistor. A so-called flyback converter has a coupled storage throttle with an air gap as an energy store. The storage throttle is structured like a transformer, but with an air gap in the core which is used for energy storage. The RCD element consists in the example in FIG. 1 of U.S. Pat. No. 5,986,905 A of a diode which is connected in series to a parallel circuit comprising a capacitor and a resistor. The RCD element in U.S. Pat. No. 5,986,905 A is arranged in series to the switch.

DE 36 16 160 A1 relates to a DC/DC single-transistor forward converter and in order to attenuate voltage overshoots proposes the arrangement of an RC or RCD circuit of the transistor. This discharge circuit of the transistor consists of the series-connection of a throttle with two diodes, which is connected from the negative pole in the conducting direction to the positive pole of the input voltage UE, and of a capacitor which lies between the connection point of the two diodes and the collector of the transistor.

Known embodiments of the RCD element have the disadvantage that they cannot be used in a device which serves both as a downward converter (buck converter), such as to charge a battery, and also as an upward converter (step-up converter), such as to boost the power grid from a battery, because during buck conversion the RCD element is charged in the case of the step-up converter transistor $T_H$ during turn-on of the buck converter transistor $T_T$ and would cause very high turn-on losses in the buck converter transistor $T_T$, and during step-up conversion the RCD element is charged in the case of the buck converter transistor $T_T$ during turn-on of the step-up converter transistor $T_H$ and would cause very high turn-on losses in the step-up converter transistor $T_H$.

SUMMARY OF THE INVENTION

It is an object of the present invention to make available a DC/DC converter which ensures the damping of the voltage overshoots of a semiconductor switch, in particular of a transistor, with an RCD element both during operation as a downward converter and also during operation as an upward converter.

This object is achieved by a DC/DC converter.

To avoid voltage overshoots for at least one semiconductor switch, an RCD element is provided, wherein the capacitor and the diode of the RCD element are connected to one another in series and the resistor of the RCD element can be connected either in parallel to the diode or disconnected from it by means of a switch, and wherein the diode of the RCD element is arranged such that it blocks in the conducting direction of the semiconductor switch.

The functionality of the inventive circuit can be approximately described on the basis of FIG. 1: during the turn-off procedure of the buck converter transistor $T_T$ the voltage at the emitter drops at a very high rate (large dU/dt). This voltage gradient is reduced as from a certain instant in the turn-off procedure, because the current or part of the current which has flowed through the buck converter transistor $T_T$ is taken over by the capacitor $C_T$ and the diode $D_T$. This current starts to flow as from the time of the switching procedure and not just when the voltage at the step-up converter transistor $T_H$ has reached the forward voltage of the freewheeling diode of the step-up converter transistor $T_H$.

If the resistor of the RCD element is disconnected by the diode, it can either be functionless, or it can be provided that it is connected in parallel to the capacitor of the RCD element. The latter is done in order to discharge the capacitor. Otherwise it is discharged the first time the transistor, which is parallel to the RCD, is switched on. If the transistor is switched on too fast, this can lead to the destruction of the transistor and/or of the diode of the RCD element.

The diode of the RCD element must be arranged such that it conducts in the same direction as the freewheeling diode of the transistor. In other words, the diode is reversed compared to the normal conducting direction.

One embodiment of the invention relates to the fact that the RCD element is connected in parallel to a semiconductor switch or a freewheeling diode, in particular is connected directly at the input and output of the semiconductor switch or of the freewheeling diode.

In a combined upward and downward converter (step-up and buck converter) there are two actuatable (controllable) switches, one between input and coil (buck converter switch) to function as a downward converter (buck converter), and one between the connection point of buck converter switch and coil and negative pole (parallel to the coil with capacitor) to function as an upward converter (step-up converter). The RCD element for damping the switch of the downward converter (buck converter) is then arranged in parallel to the switch for the upward converter (step-up converter), and the RCD element for damping the switch of the upward converter (step-up converter) is then arranged in parallel to the switch for the downward converter (buck converter).

In a DC/DC converter which is implemented only as a downward converter (buck converter), the switch for the upward converter (step-up converter) would be replaced by a non-switchable (non-controlled) "switch", namely by a freewheeling diode. The RCD element for damping the switch of the upward converter (step-up converter) is then omitted, and the RCD element for damping the switch of the downward converter (buck converter) is then arranged in parallel to the freewheeling diode. This is illustrated in FIG. 6.

Matters are similar with a DC/DC converter which is implemented only as an upward converter (step-up converter): the switch for the downward converter (buck converter) is replaced by a non-switchable (non-controlled) "switch", namely by a diode. The RCD element for damping the switch of the downward converter (buck converter) is then omitted, and the RCD element for damping the switch of the upward converter (step-up converter) is then arranged in parallel to the freewheeling diode.

The switch to commutate the resistor can be implemented as a relay, which has the advantage that the actuation of a relay is easier to implement than an actuation for a transistor. Further, the commutation ensures that the capacitor of the RCD element, which is parallel to the transistor, is discharged by this transistor before being switched on.

The switch for switching on the resistor can be implemented as a transistor, which has the advantage that it can be switched using the switching frequency of the buck or step-up converter and it is possible to precharge the capacitor to a particular value.

The variant of the embodiment whereby a charging circuit is provided for the capacitor of the RCD element has the advantage that the energy stored in the capacitor is not dissipated in the resistor, but is fed back.

To save on a resistor and a switch in the case of two RCD elements, it can be provided that two semiconductor switches are each provided with an RCD element and the two RCD elements merely have one shared resistor and one shared switch.

The inventive method for operating a DC/DC converter with two controllable semiconductor switches, namely a buck converter transistor and a step-up converter transistor, provides that for operation as a downward converter (buck converter) only the buck converter transistor is switched on, the resistor in the RCD element connected in parallel to the buck converter transistor $T_T$ is connected in parallel to the capacitor and the resistor in the RCD element connected in parallel to the step-up converter transistor is connected or disconnected in parallel to the diode.

For operation as an upward converter (step-up converter) it is provided that only the step-up converter transistor is switched on, the resistor in the RCD element connected in parallel to the step-up converter transistor is connected in parallel to the capacitor and the resistor in the RCD element connected in parallel to the buck converter transistor is connected or disconnected in parallel to the diode.

BRIEF DESCRIPTION OF THE DRAWING

For further elucidation of the invention reference is made in the following part of the description to the figures, from which further advantageous embodiments, details and developments of the invention can be taken, in which.

DETAILED DESCRIPTION OF PREFERRED EMBODIMENTS

Figure 1:
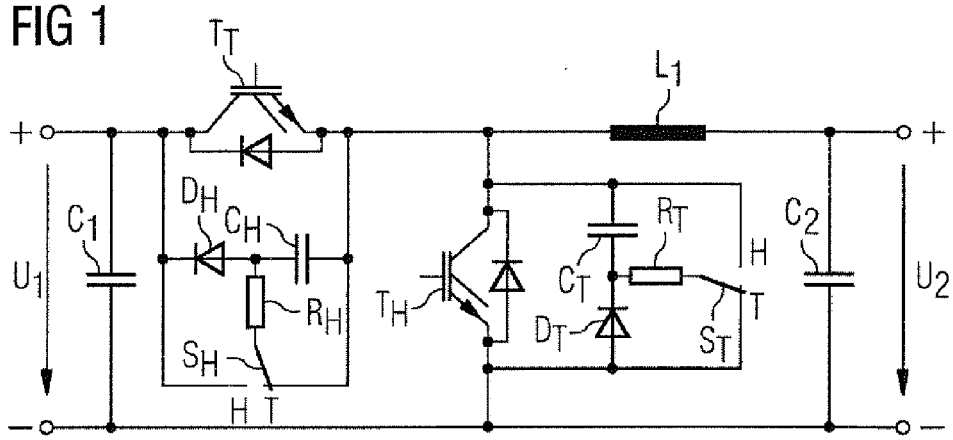
FIG. 1 shows a schematically illustrated, inventive DC/DC converter with relay for commutating the resistors in the RCD elements.

FIG. 1 shows an inventive upward and downward converter. A basic conventional upward and downward converter merely comprises the input capacitor $C_1$, the output capacitor $C_2$, the so-called buck converter transistor $T_T$, the step-up converter transistor $T_H$, and the coil (inductance) $L_1$.

Connected in antiparallel fashion in each case to the buck converter transistor $T_T$ and the step-up converter transistor $T_H$ is a freewheeling diode. In buck converter operation the current changes (commutates) from $T_T$ to the freewheeling diode, which is antiparallel to $T_H$. In step-up operation the current changes (commutates) from $T_H$ to the freewheeling diode, which is antiparallel to $T_T$. These diodes are mostly integrated into the housing of an IGBT, but can also be arranged antiparallel to the IGBT and have a separate housing.

The inventive RCD element is not arranged in the immediate vicinity of the transistor to be protected, but where the so-called "freewheeling diode" would be arranged if the DC/DC converter were implemented only as a downward converter (buck converter) or only as an upward converter (step-up converter): the RCD element which protects the buck converter transistor $T_T$ consists of the following components: resistor $R_T$, capacitor $C_T$ and diode $D_T$, and is connected in parallel to the step-up converter transistor $T_H$, or in parallel to the series circuit consisting of coil $L_1$ and output capacitor $C_2$. In this case capacitor $C_T$ and diode $D_T$ are connected to one another in series, and the capacitor $C_T$ is arranged in the current flow direction of the step-up transistor $T_H$ (here from the top positive pole to the bottom negative pole) upstream of the diode $D_T$. The resistor $R_T$ is connected between capacitor $C_T$ and diode $D_T$, and is implemented by means of a switch $S_T$, which is here implemented as a relay, and can be connected either in parallel to the capacitor $C_T$ or to the diode $D_T$. It would also be conceivable for the resistor $R_T$ to be completely disconnected in another variant of the embodiment.

The RCD element, which protects the step-up converter transistor $T_H$, consists of the following components: resistor $R_H$, capacitor $C_H$ and diode $D_H$, and is connected in parallel to the buck converter transistor $T_T$. In this case capacitor $C_H$ and diode $D_H$ are connected to one another in series, and the capacitor $C_H$ is arranged in the current flow direction of the buck converter transistor $T_T$ (from the emitter to the collector) downstream of the diode $D_H$. The resistor $R_H$ is connected between capacitor $C_H$ and diode $D_H$, and by means of a switch $S_H$, which is here implemented as a relay, can be connected either in parallel to the capacitor $C_H$ or to the diode $D_H$. It would also be conceivable for the resistor $R_H$ to be disconnected completely in another variant of the embodiment.

If the DC/DC converter as illustrated in FIG. 1 works as a downward converter (buck converter), for instance if a battery connected at the output is to be charged, it works from left to right. In this case only the buck converter transistor $T_T$ is clocked (switched on), the step-up converter transistor $T_H$ remains switched off, the resistor $R_H$ in the RCD element connected in parallel to the buck converter transistor $T_T$ is connected in parallel to the capacitor $C_H$, and the resistor $R_T$ in the RCD element connected in parallel to the step-up converter transistor $T_H$ is connected in parallel to the diode $D_T$. This is illustrated by the switching positions "T" of the switches $S_H$, $S_T$.

If the DC/DC converter in FIG. 1 is to work as an upward converter (step-up converter), it works from right to left. In this case only the step-up converter transistor $T_H$ is clocked (switched on), the resistor $R_T$ in the RCD element connected in parallel to the step-up converter transistor $T_H$ is connected in parallel to the capacitor $C_T$, and the resistor $R_H$ in the RCD element connected in parallel to the buck converter transistor $T_T$ is connected in parallel to the diode $D_H$. This is illustrated by the switching positions "H" of the switches $S_H$, $S_T$.

Figure 2:
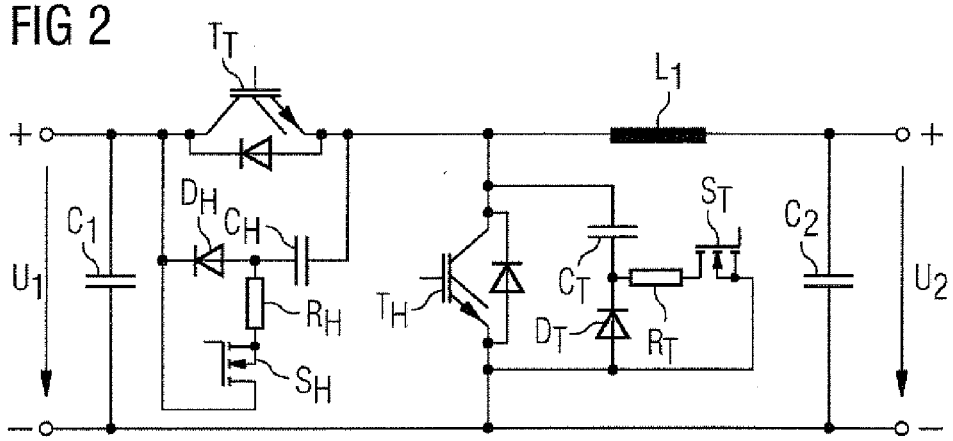
FIG. 2 shows a schematically illustrated, inventive DC/DC converter with transistors for commutating the resistors in the RCD elements.

The embodiment according to FIG. 2 corresponds to the one according to FIG. 1, with the difference that for the switches $S_T$ and $S_H$ not relays but semiconductor switches are provided, which are connected such that they can connect the resistor $R_H$ or $T_H$ either only in parallel to the diode $D_H$ or $R_H$ or can disconnect it completely.

If the DC/DC converter in FIG. 2 works as a downward converter (buck converter), only the buck converter transistor $T_T$ is clocked (switched on), the resistor $R_H$ in the RCD element connected in parallel to the buck converter transistor $T_T$ is disconnected, and the resistor $R_T$ in the RCD element connected in parallel to the step-up converter transistor $T_H$ is connected in parallel to the diode $D_T$. If the DC/DC converter in FIG. 2 is to work as an upward converter (step-up converter), only the step-up converter transistor $T_H$ is clocked (switched on), the resistor $R_T$ in the RCD element connected in parallel to the step-up converter transistor $T_H$ is disconnected, and the resistor $R_H$ in the RCD element connected in parallel to the buck converter transistor $T_T$ is connected in parallel to the diode $D_H$.

Figure 3:
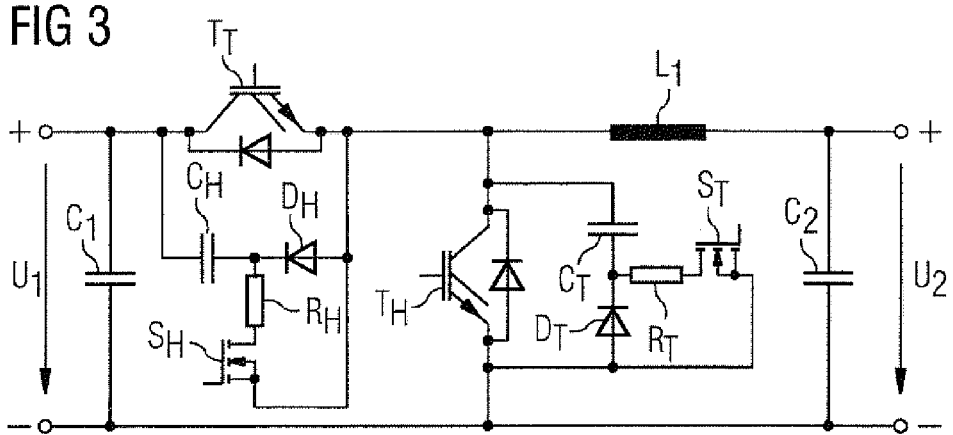
FIG. 3 shows a variant circuit to FIG. 2.

The embodiment according to FIG. 3 corresponds to the one in FIG. 2, with the difference that in FIG. 3 the position of the capacitor $C_H$ is swapped with that of the diode $D_H$, i.e. is arranged in the current flow direction of the buck converter transistor $T_T$ of the capacitor $C_H$ upstream of the diode $D_H$. The resistor $R_H$ can however likewise be connected by means of the switch $S_H$ either in parallel to the diode $D_H$ or can be disconnected from it completely. The advantage lies in the use of a potential-free supply voltage for the driver for $T_T$ and $S_H$ and a second potential-free supply voltage for the driver for $T_H$ and $S_T$. A bootstrap circuit for the supply of $T_T$ and $S_H$ is also possible.

Figure 4:
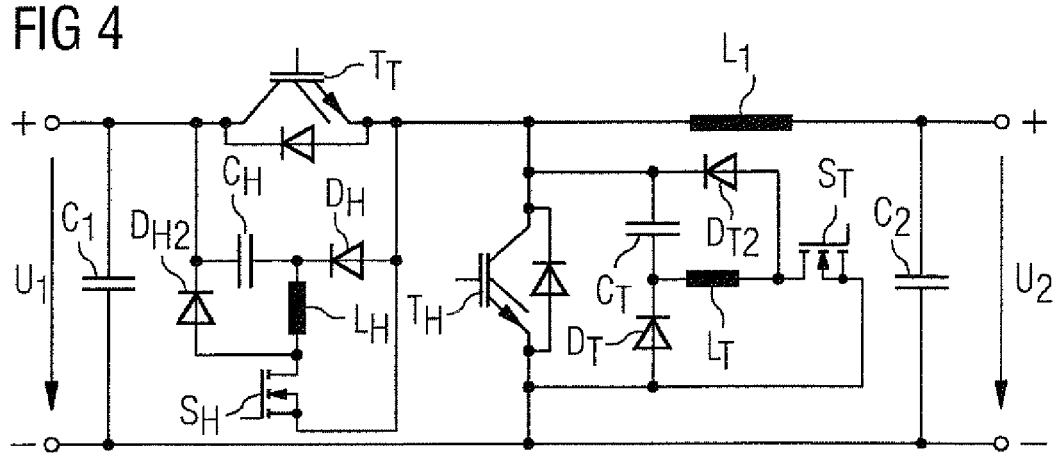
FIG. 4 shows the variant circuit from FIG. 3 with electronic charging circuit for the capacitors of the RCD element.

FIG. 4 illustrates an electronic charging circuit for the capacitors $C_H$, $C_T$ of the RCD elements. Thus it is possible to establish the voltage to which the capacitors $C_H$, $C_T$ are charged. The voltage to which the capacitors $C_H$, $C_T$ are charged is determined by the switch-on duration and the switch-on instant of the charging circuit.

Based on FIG. 3 the resistors $R_H$ and $R_T$ are replaced by coils $L_H$ and $L_T$. In addition the output of the coil $L_H$ is fed back by way of a diode $D_{H2}$ to the input of the DC/DC converter (upstream of the buck converter transistor $T_T$). The output of the coil $L_T$ is fed back by way of a diode $D_{T2}$ directly upstream of the step-up converter transistor $T_H$. The diodes are in this case fitted in the non-conducting direction—against the current flow direction of the transistors $T_T$ and $T_H$ from the emitter to the collector.

Figure 5:
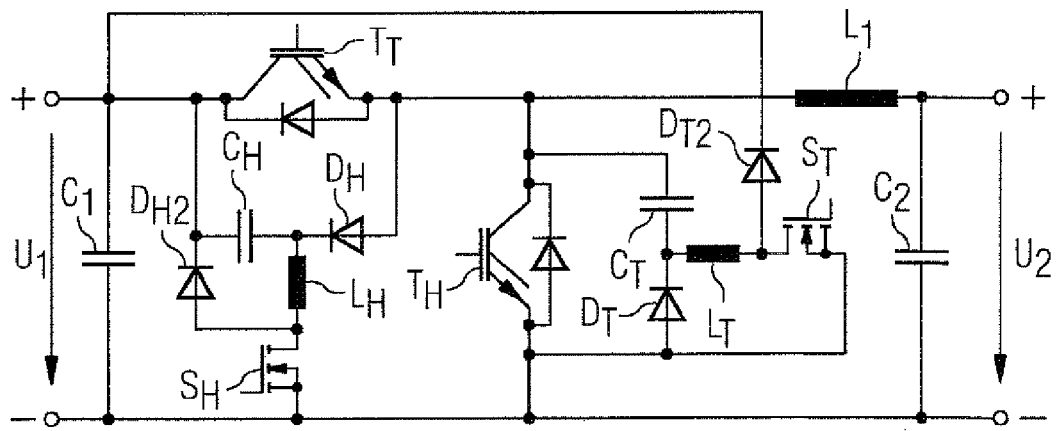
FIG. 5 shows the variant circuit from FIG. 3 with a further embodiment of the electronic charging circuit for the capacitors of the RCD element.

In the variant of the embodiment according to FIG. 5—in contrast to FIG. 4—the output of the coil $L_T$ is fed back by way of the diode $D_{T2}$ upstream of the buck converter transistor $T_T$, i.e. to the input of the DC/DC converter.

Figure 6:
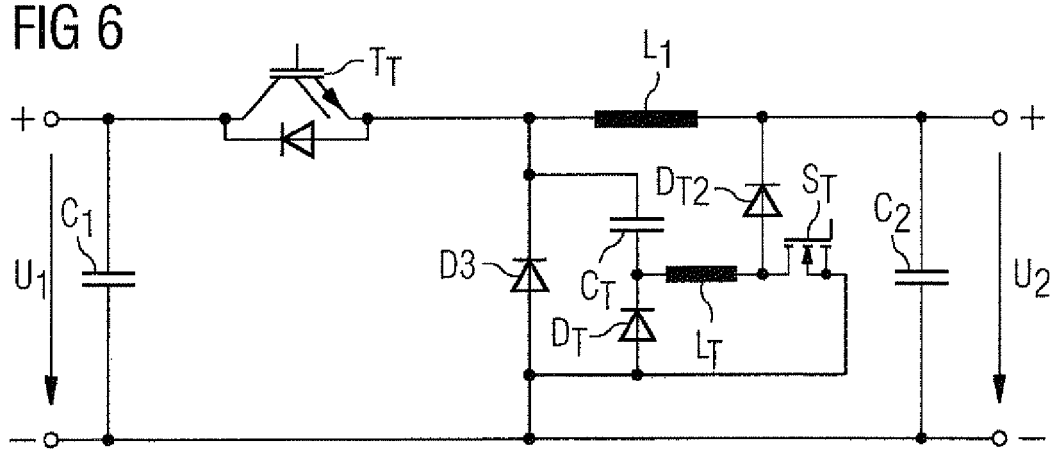
FIG. 6 shows an inventive DC/DC converter embodied as a downward converter (buck converter) with an electronic charging circuit for the capacitor of the RCD element, which corresponds to the one in FIG. 5.

FIG. 6 illustrates an inventive downward converter (buck converter). Thus in comparison to FIGS. 1-5 the step-up converter transistor $T_H$ and the RCD element assigned thereto ($R_H$ or $L_H$, $C_H$ and $D_H$) can be omitted. Instead of the step-up converter transistor $T_H$ there is a freewheeling diode $D_3$, which is fitted against the current flow direction of the step-up converter transistor $T_H$. In this embodiment it is also possible to leave out the switch $S_T$.

Figure 7:
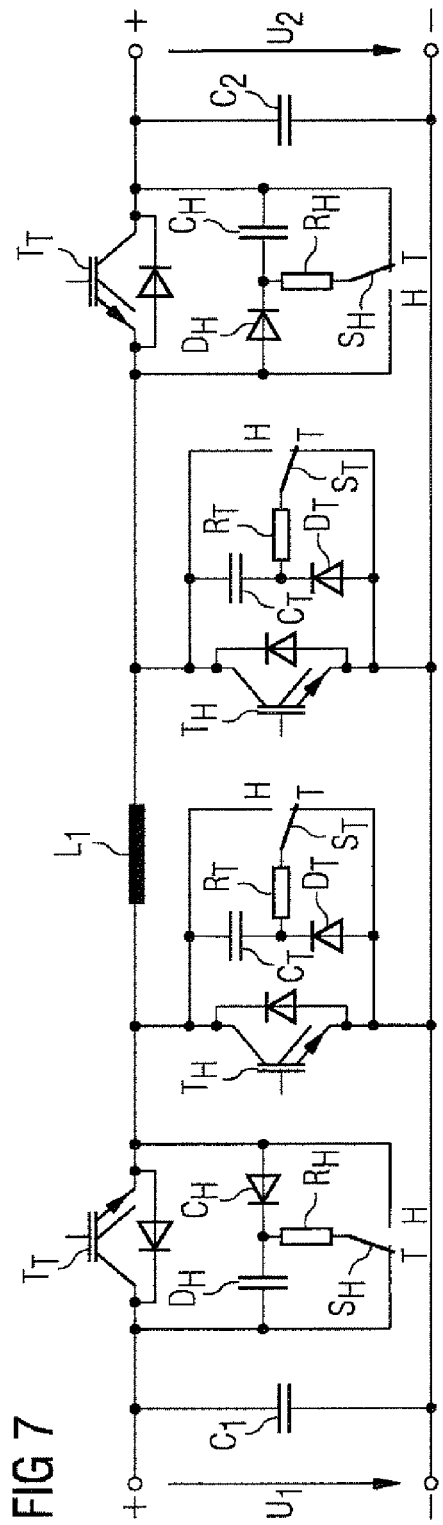
FIG. 7 shows a schematically illustrated, inventive DC/DC converter with two half-bridges.

It is also possible to position a second "half-bridge" ($T_{T2}$ and $T_{H2}$) at the output of the coil (between coil $L_1$ and capacitor $C_2$), see FIG. 7. Thus it is possible for current to flow in both directions regardless of the size of the input voltage $U_1$ and the size of the output voltage $U_2$.

Figure 8:
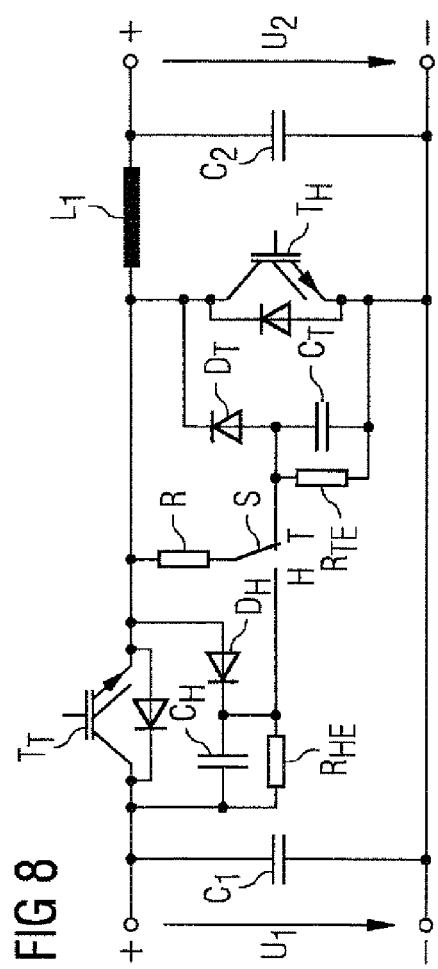
FIG. 8 shows a schematically illustrated, inventive DC/DC converter only with a relay and resistor for commutating the RCD elements.

In FIG. 8 the positions of the diodes and capacitors in the RCD element are swapped in comparison to FIG. 1. Thus it is possible to save a relay and one of the RCD resistors. In addition, high-impedance resistors $R_{HE}$ and $R_{TE}$ are still arranged in parallel to the capacitors $C_H$ and $C_T$ of the RCD elements. These ensure that the capacitors $C_H$ and $C_T$ are discharged in the disconnected state of the RCD element. It is also possible to omit these resistors, so that the step-up converter transistor $T_H$ and the buck converter transistor $T_T$ can consume the stored energy in the capacitor of the RCD element at switch-on.

In principle the switches for the resistors of the RCD elements can be implemented in all variants of the embodiments shown as electromechanical switches (relays) or as electronic switches,

What is claimed is:

1. A DC/DC converter, comprising
an active energy store having an inductance,
a first controllable semiconductor switch configured to periodically charge the active energy store, and
a second controllable semiconductor switch configured to periodically discharge the active energy store, with at least one of the first and second controllable semiconductor switches having an RCD element to prevent voltage overshoots for the at least one of the first and second controllable semiconductor switches, said RCD element comprising a capacitor and a diode connected in series and a resistor, and furthermore a switch having a first switching position connecting the resistor in parallel with the diode and a second switching position disconnecting the resistor from the diode, wherein the diode is arranged in series with the capacitor so as to be conducting in a direction of a current flowing from an emitter to a collector of the at least one of the first and second controllable semiconductor switches and to be blocking the current when the at least one of the first and second controllable semiconductor switches is conducting.

2. The DC/DC converter of claim 1, wherein the resistor is connected in parallel to the capacitor in the second switching position.

3. The DC/DC converter of claim 1, wherein the RCD element is connected in parallel with the first controllable semiconductor switch.

4. The DC/DC converter of claim 1, wherein the RCD element is connected in parallel with the second controllable semiconductor switch.

5. The DC/DC converter of claim 1, wherein the RCD element is connected in parallel with a freewheeling diode.

6. The DC/DC converter of claim 1, wherein the switch is constructed as a relay.

7. The DC/DC converter of claim 1, wherein the switch is constructed as a transistor.

8. The DC/DC converter of claim 1, further comprising a charging circuit for charging the capacitor of the RCD element.

9. The DC/DC converter of claim 1, wherein the first controllable semiconductor switch comprises a first RCD element having a first diode and a first capacitor and the second controllable semiconductor switch comprises a second RCD element having a second diode and a second capacitor, with the first RCD element and the second RCD element having a shared resistor connected to a shared switch which connects the shared resistor in a first switching position in parallel with the first diode and in a second switching position in parallel with the second diode.

10. The DC/DC converter of claim 1, wherein the first controllable semiconductor switch comprises a buck converter transistor.

11. The DC/DC converter of claim 1, wherein the second controllable semiconductor switch comprises a step-up converter transistor.

12. The DC/DC converter of claim 1, wherein the first and second controllable semiconductor switches comprise transistors.

13. A method for operating a DC/DC converter having an active energy store in form of an inductance, a first controllable semiconductor switch constructed as a buck converter transistor configured to periodically charge the active energy store and a second controllable semiconductor switch constructed as a step-up converter transistor configured to periodically discharge the active energy store, with at least one of the first and second controllable semiconductor switches having an RCD element to prevent voltage overshoots for the at least one of the first and second controllable semiconductor switches, said RCD element comprising a capacitor and a diode connected in series and a resistor, and furthermore a switch having a first switching position connecting the resistor in parallel with the diode and a second switching position disconnecting the resistor from the diode, wherein the diode is arranged in series with the capacitor so as to be conducting in a direction of a current flowing from an emitter to a collector of the at least one of the first and second controllable semiconductor switches and to be blocking the current when the at least one of the first and second controllable semiconductor switches is conducting, the method comprising:
for operation as a buck converter, switching only the buck converter transistor on, connecting the resistor in the RCD element, that is connected in parallel to the buck converter transistor, in parallel with the capacitor of the buck converter transistor, and
selectively connecting the resistor, that is connected in parallel with the step-up converter transistor, in parallel with the diode in the RCD element of the step-up converter transistor or disconnecting the resistor from the diode.

14. A method for operating a DC/DC converter having an active energy store in form of an inductance, a first controllable semiconductor switch constructed as a buck converter transistor configured to periodically charge the active energy store and a second controllable semiconductor switch constructed as a step-up converter transistor configured to periodically discharge the active energy store, with at least one of the first and second controllable semiconductor switches having an RCD element to prevent voltage overshoots for the at least one of the first and second controllable semiconductor switches, said RCD element comprising a capacitor and a diode connected in series and a resistor, and furthermore a switch having a first switching position connecting the resistor in parallel with the diode and a second switching position disconnecting the resistor from the diode, wherein the diode is arranged in series with the capacitor so as to be conducting in a direction of a current flowing from an emitter to a collector of the at least one of the first and second controllable semiconductor switches and to be blocking the current when the at least one of the first and second controllable semiconductor switches is conducting, the method comprising:
for operation as a step-up converter, switching only the step-up converter transistor on, connecting the resistor in the RCD element, that is connected in parallel to the step-up converter transistor, in parallel with the capacitor of the step-up converter transistor, and
selectively connecting the resistor, that is connected in parallel with the buck converter transistor, in parallel with the diode in the RCD element of the buck converter transistor or disconnecting the resistor from the diode.

* * * * *